United States Patent [19]
Vogelsang

[11] Patent Number: 5,236,016
[45] Date of Patent: Aug. 17, 1993

[54] CABLE-GUIDE ASSEMBLY OF PLASTIC TUBES JOINED BY WEBS

[75] Inventor: Horst Vogelsang, Herten, Fed. Rep. of Germany

[73] Assignee: Dipl.-Ing. Dr. Ernst Vogelsang GmbH & Co. KG, Herten/Westf., Fed. Rep. of Germany

[21] Appl. No.: 751,189

[22] Filed: Aug. 29, 1991

[30] Foreign Application Priority Data

Sep. 24, 1990 [DE] Fed. Rep. of Germany ....... 4030217
Dec. 8, 1990 [DE] Fed. Rep. of Germany ....... 4039275

[51] Int. Cl.⁵ .............................................. F16L 9/18
[52] U.S. Cl. .................................... 138/115; 138/111; 174/95
[58] Field of Search .................. 138/111, 115, 108; 174/95, 68.3; 285/109, 188

[56] References Cited

U.S. PATENT DOCUMENTS

| 764,779 | 7/1904 | Stone | 138/115 |
| 1,141,067 | 5/1915 | Lloyd | 138/111 |
| 1,668,179 | 5/1928 | Williams | 138/115 |
| 4,399,319 | 8/1983 | Zinn | 138/111 |
| 4,582,093 | 4/1986 | Hubbard et al. | 138/111 |
| 5,036,891 | 8/1991 | Vogelsang | 138/115 |
| 5,069,254 | 12/1991 | Vogelsang | 138/111 |

FOREIGN PATENT DOCUMENTS

| 160498 | 11/1985 | European Pat. Off. | 138/115 |
| 1082953 | 6/1960 | Fed. Rep. of Germany | 174/95 |
| 3206252 | 9/1983 | Fed. Rep. of Germany | 174/95 |
| 3217401 | 11/1983 | Fed. Rep. of Germany | 138/111 |
| 3540690 | 5/1987 | Fed. Rep. of Germany | 174/95 |
| 3603056 | 8/1987 | Fed. Rep. of Germany | 174/95 |
| 3806663 | 3/1989 | Fed. Rep. of Germany | 174/95 |
| 2580437 | 10/1986 | France | 174/95 |
| 701690 | 3/1966 | Italy | 174/95 |

Primary Examiner—James E. Bryant, III
Attorney, Agent, or Firm—Herbert Dubno

[57] ABSTRACT

A cable-guide assembly of particular utility in ground subsidence regions consists of three tubes extruded simultaneously with the connecting webs and abutting at hexagonal segments form with two angularly adjoining surfaces. A subsequently applied sealing strip or a sealing strip formed on one of the tubes not interconnected by a connecting web can bridge between the two tubes which are not interconnected by such webs when the bundle is formed.

2 Claims, 2 Drawing Sheets

CABLE-GUIDE ASSEMBLY OF PLASTIC TUBES JOINED BY WEBS

CROSS REFERENCE TO RELATED APPLICATIONS

This related application is related to my copending application Ser. No. 07/450,866 filed 14 December 1989 (now U.S. Pat. No. 5,069,254). Reference may also be had to U.S. Pat. 5,036,891, issued 6 August 1991 which was copending therewith.

FIELD OF THE INVENTION

My present invention relates to a cable-guide conduit assembly and to a method of making same. More particularly, the invention relates to a cable-guide conduit assembly which consists essentially of a plurality of identical tubes, e.g. extruded from a thermoplastic synthetic resin, having connecting webs which can be formed on the plastic tube and are deformable so that the assembly can be opened out into a planar array of the tubes or rolled or folded inwardly so that the tubes abut one another laterally and form a cable-guide conduit bundle.

BACKGROUND OF THE INVENTION

As described in the prior work referred to above, systems in which the assembly can be opened out into a planar array of the tubes allow the assembly to be rolled after extrusion and thus conveniently transported to a site at which the assembly is to be installed, generally in a subterranean application.

At the site, the tubes of the assembly can be rolled together lengthwise to form a compact bundle which may be laid directly in the ground or can be fed into a protective pipe.

The cables can then be threaded through the tubes or conduits of the assembly. The planar assembly is generally formed from the thermoplastic synthetic resin by extrusion and can be rolled up immediately following extrusion for transport in the manner described.

It will be understood that the bundle formed by the tubes or conduits can be fixed in position, e.g. by wrapping a tie around the bundle or by equipping the bundle with appropriate means or retainers for holding the tubes in position.

The bundle can be laid straight or along an arcuate path and for that purpose and, to enable the coiling of the planar array on a drum and the uncoiling thereof, the assembly should be sufficiently elastically deformable to preclude collapse of the tubes and to enable the assembly to maintain its configuration both upon transportation and in the handling incident to bundling or opening up of the bundle.

Prior to the developments described in my earlier work, i.e. in the art, cable-guide conduits have been known wherein the individual plastic tubes have a round outer cross section and a correspondingly round inner cross section. This configuration facilitates fabrication as well as the coiling of the product on a drum and its uncoiling from the drum. When the tubes are, however, brought together in the bundle, they do not lie complementarily against one another, but rather have only line contact with one another.

As a consequence, between the plastic tubes and their webs, relatively large gaps and more or less free space can form. While this free space does facilitate arcuate placing of the cable-guide conduit bundle and relatively small radii of curvature, when the bundle is placed directly in the ground water can penetrate through the gaps and into the free spaces so that the cable-guide conduit bundle can become a drainage pipe along which water may run.

Soil and other materials in the environs of the bundle can penetrate into the gaps and free space and reduce the relative mobility of the conduits of the bundle in subterranean applications were some mobility is essential if rupture is to be precluded because of subsidence.

More recently, it has been proposed (see German Patent Document DE 36 03 849) to provide a cable-guide tube bundle which is composed of a plurality of plastic pipes which have a modified triangular outer cross section shape. The modified triangular shape has very pronounced rounding of the corners of the triangle and an outer limb which itself can be curved.

Because of this particular shape, within the interior of the bundle a relatively large amount of dead space is provided through which cable cannot be passed. The amount of material constituting the conduit bundle is comparatively high because the ratio of the cross section of the bundle to the ratio of the cross section of the cable passages is high.

Problems are also encountered with this system in the coiling of the extruded product because the shapes of the tubes provides a significant resistance to the coiling operation. Furthermore, in the coiling and uncoiling undesirable modifications of the cross section of the tubes may occur. Because of such deformations and deformations which occur in the placing of the tube bundle or shifting of the earth in which the tube bundles are received, rupture can occur between the individual plastic tubes so that water can penetrate into the assembly.

In German Patent Document DE 39 09 813 (see U.S. Pat. No. 5,036,891), I have described a conduit assembly which can be coiled and uncoiled without difficulty. Detrimental free spaces are not of concern. In that system the plastic tubes have polygonal outer cross sections with more than three sides so that, in the bundled configuration, the individual plastic tubes fit complementarily together. The plastic tubes can, however, be unbundled to a planar array for coiling and uncoiling. In a preferred embodiment, the individual plastic tubes have hexagonal cross sections.

The cable-guide assembly there described satisfies all of the requirements for handling and in placing in the ground, but in regions subject to shifting of the ground, earthquake regions or regions in which there is substantial subsidence, the stability of the tube bundle can be improved further.

OBJECTS OF THE INVENTION

It is, therefore, the principal object of the present invention to provide a cable-guide conduit bundle which, upon emplacement in the ground, especially in regions subject to significant movement of the ground and particularly subsidence, the bundle can retain its stability and, even with relative movement of the contact surfaces against one another, stability will be ensured Another object is to provide an improved conduit assembly which retains the advantages of the conduit assemblies of my earlier systems and yet has improved stability, especially when utilized in ground subsidence areas.

SUMMARY OF THE INVENTION

These objects and others which will become apparent hereinafter are attained, in accordance with the invention, in a cable-guide assembly which comprises a plurality of conduits or tubes of plastic and identical external cross sections, which are interconnected by flexible webs so that these tubes can open out in a planar array or can be curled transversely so that complementary contact surfaces are formed between each two tubes for two sides of a third tube in the formation of a tube bundle which is particularly resistant to rupture in the case of subsidence of the ground by permitting relative mobility at the contact surfaces.

According to the invention, the cable-guide bundle is characterized by a combination of the following features:

a. The cable tube bundle consists of exactly three plastic conduits or tubes;

b. The plastic tubes have an outer cross section which at least partially conforms to that of a regular hexagon including at least two angularly adjoining sides of a regular hexagon.

c. The sides of one plastic pipe form the contact surfaces for a side of each of the other plastic pipes.

d. The contact surfaces of the plastic pipes in the bundle lie flat against one another and form at most small contact gaps so that, apart from these contact gaps the tubes in the bundled configuration form a massive tube bundle coil; and e. The connecting webs form sealing strips extending all along the length of the assembly and which span across the respective contact gaps and free spaces defined with each pair of the tubes, outwardly of the respective contact gap.

More particularly, a cable-guide conduit assembly according to the invention comprises:

a group of only three plastic conduit tubes having identical outer cross sections of the configuration of part of a regular hexagon defined by two angularly adjoining flat sides; and flexible connecting webs of plastic formed unitarily with the tubes and interconnecting same so that the tubes can be selectively disposed in a plane and rolled by bending at the webs into a bundle so that the two angularly adjoining flat sides of each conduit tube flatly contact respective flat sides of the other two tubes with at most small contact gaps between the mutually contacting surfaces and all other outer surfaces of the conduit tubes are free from contact with other tubes of the assembly and bundle, the webs each spanning across a free space between two tubes interconnected by each web and sealing a respective contact gap opening at the respective free space from the exterior, the tubes in the bundle forming, apart from the gaps, a massive core.

The invention is based upon my discovery that the plastic tubes of a tube bundle having only three plastic tubes and brought into contact in the manner described, forms a structure which is statically determined in the sense that it has high stability because of the manner in which the three tubes bear upon one another, but which is highly advantageous when the conduit bundle is to be laid in an arcuate pattern while retaining its stability and when it is to be laid in earth-subsidence regions in which later mobility of the earth must be taken into consideration and could pose problems with earlier systems. The bundle of the invention can also be fabricated particularly simply, the assembly can be coiled in the flat state with ease, and the bundle formed readily.

According to a feature of the invention, the plastic tubes have round inner cross sections although it is possible, within the scope of the invention to the internal cross sections, i.e. the cross sections of the bores of the tubes so that they conform to the configuration of a regular hexagon. The outer cross section can correspond to a regular hexagon although it is also possible to provide an arc segmental configuration bridging the two flat sides or two opposite sides of a regular hexagon when the segment of the regular hexagon with which the tube is provided includes four sides thereof.

In a preferred embodiment of the invention, which yields an assembly which can be formed into the bundle with particular ease and which allows the bundle to be easily drawn into a protective pipe, the plastic tubes each have outer cross sections with the inner portion of the tube in terms of the bundle conforming to the cross section corresponding to the hexagonal cross section and forming the contact surfaces. The outer segment has a circular cross section which directly and directly adjoins the hexagonal segment. This configuration can be made with especially high precision in the calibration of the tube and allows the three tubes to be brought together also with high precision and ease. In this embodiment the segment with the circular outer cross section can adjoin corners of the regular hexagon segment directly or can merge with tangential sides thereof. In the preferred embodiment, the cylindrical segment is semicylindrical, i.e. the circular cross section extends over a semicircle and the hexagonal segment corresponds to have a regular hexagon.

The connecting webs are preferably spaced from corners of the regular hexagon and most advantageously are spaced from corners of the regular hexagon by a distance equal to half the side length of the regular hexagon. In other words the webs are located in a region which would be approximately half way along the sides of the regular hexagon of which the segment forms the flat surfaces of that tube. The webs are formed unitarily with the tubes and may be formed on the cylindrical segment or at the junction between the cylindrical segment and the hexagonal segment.

In forming the tube bundle it is possible to leave the outer two tubes unconnected by a web and thus the contact gap between these tubes unsealed or uncovered by a connecting web.

However, in a preferred embodiment of the invention, even this contact gap is sealed by a web. This web can be a sealing strip which is applied to the two outer tubes once the bundle is formed, e.g. by welding the plastic strip to the plastic tubes.

Preferably, moreover, the sealing strip is formed unitarily at one side with one of the two outer tubes like a connecting web and, after the bundle is formed, is heat sealed or ultrasonically welded to the other outer tube.

The weld seam applied in this case may be a continuous weld seam although spot welding may be used. It is only required, of course, that the welding operation be sufficient to exclude penetration of substances into the free space and contact gap sealed by the this strip.

The invention also includes an improved method of making a tube assembly for a cable-guide conduit bundle as described previously. In this process, the connected webs are coextruded with the tube and while the extruded product retains its extrusion heat, the assembly is passed through a calibrating tool or die which calibrates the cross section and thus the outer surfaces to impart the appropriate dimensions thereto taking into consideration the cooling shrinkage and the fit required between the contact surfaces. In this extrusion operation one of the outermost plastic tubes is formed unitarily with the cover strip described above and this cover strip can be broader or wider than the contacting strips to facilitate the weld seam formed later. The extrusion with the cover strip is simplified when the cover strip is made thicker than the connecting webs. In a preferred embodiment of the invention, the cover strip is formed unitarily at its free edge with a stabilizing bead forming an extrusion and welding aid. The edge bead can be removed following the welding. The edge bead can be formed preferably with a round cross section and facilitates both the uniform extrusion and the calibration.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
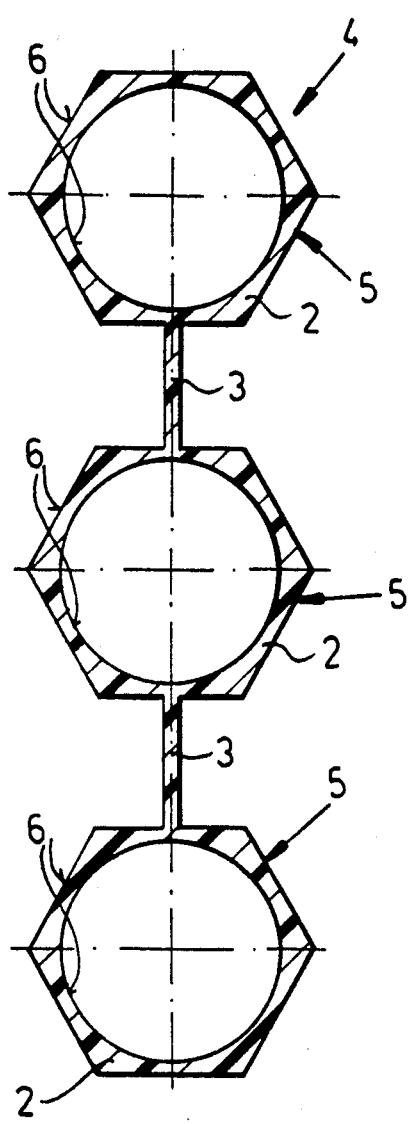
FIG. 1 is a cross sectional view through a conduit assembly which can be rolled into a cable-guide conduit bundle.
Figure 2:
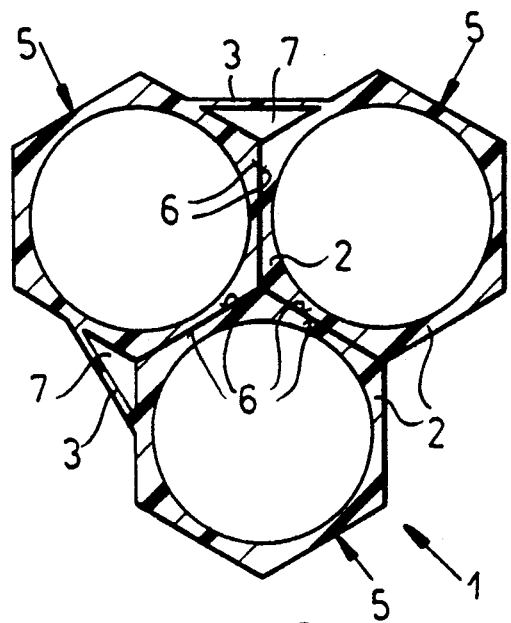
FIG. 2 is a cross sectional view of the bundle formed from the assembly of FIG. 1.
Figure 3:
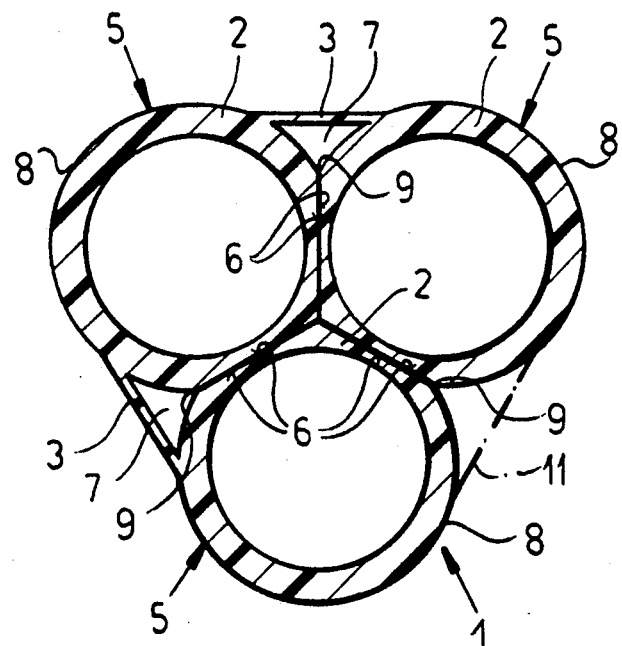
FIG. 3 is another embodiment of a tube bundle according to the invention.
Figure 4:
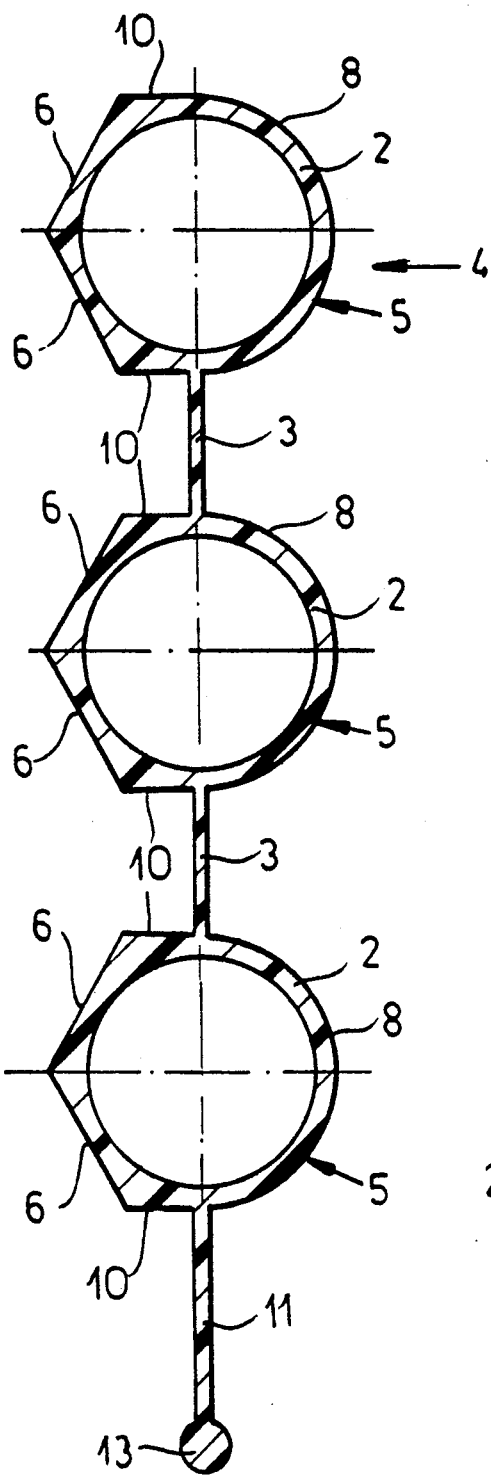
FIG. 4 is a view corresponding to FIG. 1 of an embodiment in which the tubes have a different cross section.
Figure 5:
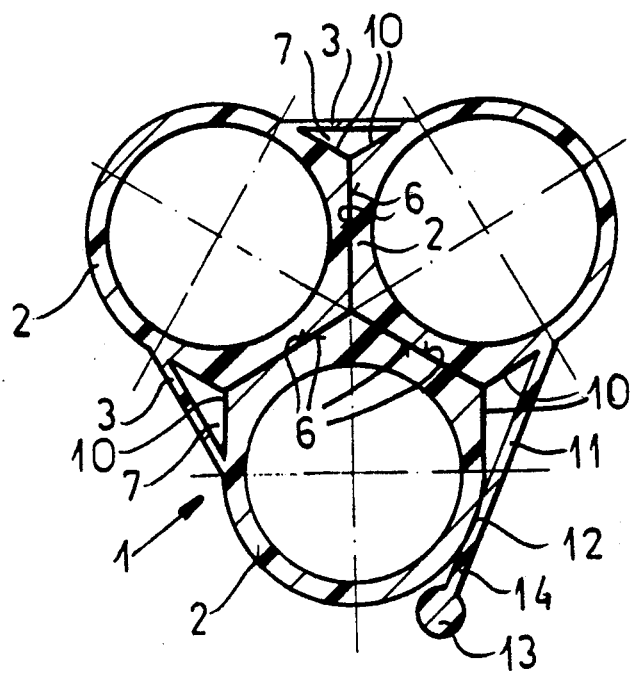
FIG. 5 is a cross sectional view of the tube bundle of the embodiment of the FIG. 4.

In each of FIGS. 2, 3 and 5, the respective cable-guide conduit bundle 1 comprises three identical plastic tubes 2 which are interconnected by webs 3 and can be opened outwardly to a planar assembly 4. Such tube assemblies have been illustrated in FIGS. 1 and 4. It will be understood that, conversely, the planar assemblies 4 can be coiled on fabrication, uncoiled at a trench site and can be formed into the tube bundle as has been illustrated in FIGS. 2, 3 and 5.

According to the invention, the cable-guide tube bundle 1 is comprised of exactly three plastic tubes 2. The plastic tubes 2 are identical and each have an outer cross section 5 that, over at least part of its perimeter, constituted of a segment of a regular hexagon having at least two angularly adjoining sides thereof.

The sides of the regular hexagon segment form contact surfaces 6 of the plastic tubes 2 in the bundle configuration 1.

The contact surfaces 6 of the plastic tubes 2 lie flat against one another with the formation possibly of small contact gaps between one another and, with contact of each surface 6 with one surface of another tube, the tubes form, apart from the contact gaps, a massive tube bundle core.

As can be seen from FIGS. 2, 3 and 5, the connecting webs 3 serve as sealing strips for the tube bundle 1 which span across and thereby seal against the exterior, the respective contact gap and a free space 7 at which the contact gap opens.

The free spaces 7 are, of course, advantageous to permit the placement of the tube bundle in arcuate patterns and to facilitate the formation of the tube bundle from the planar assembly 4.

In all of the illustrated embodiments, the plastic tubes 2 have a round inner cross section.

In the embodiment of FIGS. 1 and 2, each plastic tube 2 has an outer cross section 5 fully conforming to that of a regular hexagon.

In the embodiments of FIGS. 3 to 5, each tube 2 has an outer cross section 5 corresponding to a segment of a regular hexagon and defining the contact surfaces 6 which lie at an angle of 120 with one another, the hexagonal segment adjoining an arcuate segment 8 corresponding to a segment of a circle.

In the embodiment of FIG. 3, the arcuate segment 8 adjoins the hexagonal segment 5 at the corners 9 of the regular hexagon. In the embodiment of FIGS. 4 and 5 the circular segment 8 corresponds to a semicircle and is connected at regions 10 to the hexagonal segment which corresponds to half of a rectangular hexagon so that the regions 10 lie substantially midway along opposite sides of the rectangular hexagon.

The connecting webs 3 of the plastic tubes 2 are spaced from the corners 9 of the segment 5 of the rectangular hexagon and are unitary therewith at the outer surfaces of the tube 2 this can be readily seen from FIGS. 1 and 2. From FIGS. 4 and 5 it can be seen that the webs 3 can be connected at the regions 10 at which the hexagon segment adjoins the semicircular segment.

From FIG. 2 it will be apparent that a connector between the outer tubes 2 of the assembly of FIG. 1 is not required and the bundle can be held closed simply by its position or by tieing in some fashion. In the embodiment of FIG. 3, however, the provision of a sealing or cover strip 11 of plastic is illustrated, this strip being heat sealed or welded to the two outer tubes.

In the embodiment of FIGS. 4 and 5, the sealing strip 11 is shown to be extruded unitarily with one of the plastic tubes 2 and to be formed with a head or rib 13 of a circular cross section as an extrusion or welding aid.

After the bundle is formed (FIG. 5) the strip 11 is secured to the other end tube by a spot welding or continuous welding seam 12. The bead 13 and the projecting portion 14 of the strip 11 beyond the weld seam 12 can be removed. The rib 13 can also, if desired, be formed as a tube.

The extruded product can be calibrated in a calibrating die while still retaining its extrusion heat to form the outer surfaces and the dimensions of the article taking into consideration the shrinkage cooling of the surfaces 6 which form the tube bundle. In other words the calibration should be such that after shrinkage the surfaces 6 are of the appropriate width and are at angles of 120° to one another.

I claim:
1. A cable-guide conduit assembly comprising:
   a group of only three plastic conduit tubes having identical outer cross sections of the configuration of part of a regular hexagon defined by two angularly adjoining flat sides;
   flexible connecting webs of plastic formed unitarily with said tubes and interconnecting same so that said tubes can be selectively disposed in a plane and rolled by bending at said webs into a bundle so that the two angularly adjoining flat sides of each conduit tube flatly contact respective flat sides of the other two tubes with at most small contact gaps between the mutually contacting surfaces and all other outer surfaces of said conduit tubes are free from contact with other tubes of said assembly and bundle, said webs each spanning across a free space between two tubes interconnected by each web and sealing a respective said contact gap which opens at the respective free space said tubes in said bundle forming apart from said gaps a massive core and said tubes having outer configurations comprised of a segment of circular arc configuration connected to a segment of a regular hexagon, and said segment of circular arc configuration being semicircular in cross section and said segment of a regular hexagon being a segment of half a regular hexagon.

2. A cable-guide conduit assembly comprising:

a group of only three plastic conduit tubes having identical outer cross sections of the configuration of part of a regular hexagon defined by two angularly adjoining flat sides;

flexible connecting webs of plastic formed unitarily with said tubes and interconnecting same so that said tubes can be selectively disposed in a plane and rolled by bending at said webs into a bundle so that the two angularly adjoining flat sides of each conduit tube flatly contact respective flat sides of the other two tubes with at most small contact gaps between the mutually contacting surfaces and all other outer surfaces of said conduit tubes are free from contact with other tubes of said assembly and bundle, said webs each spanning a cross a free space between two tubes interconnected by each web and sealing a respective said contact gap which opens at the respective free space, said tubes in said bundle forming apart from said gaps a massive core.

a cover strip bridging a region between two of said tubes not connected by a connecting web, said cover strip being formed unitarily with one of said two tubes and being welded to the other of said two tubes.

* * * * *